(12) United States Patent
Wang et al.

(10) Patent No.: US 8,056,863 B2
(45) Date of Patent: Nov. 15, 2011

(54) UNIFIED ATTITUDE CONTROL FOR SPACECRAFT TRANSFER ORBIT OPERATIONS

(75) Inventors: H. Grant Wang, Madison, AL (US); Rongsheng Li, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 12/611,658

(22) Filed: Nov. 3, 2009

(65) Prior Publication Data

US 2010/0059631 A1 Mar. 11, 2010

Related U.S. Application Data

(60) Division of application No. 11/199,932, filed on Aug. 9, 2005, now Pat. No. 7,665,695, which is a continuation-in-part of application No. 10/910,430, filed on Aug. 3, 2004, now Pat. No. 7,410,130, which is a continuation-in-part of application No. 10/727,764, filed on Dec. 3, 2003, now abandoned.

(51) Int. Cl.
*B64G 1/24* (2006.01)
(52) U.S. Cl. ............... 244/164; 244/165; 244/171
(58) Field of Classification Search ............ 244/164, 244/165, 171
See application file for complete search history.

(56) References Cited

U.S. PATENT DOCUMENTS

| | | |
|---|---|---|
| 4,617,634 A | 10/1986 | Izumida et al. |
| 4,754,280 A | 6/1988 | Brown et al. |
| 4,787,579 A | 11/1988 | Smith |
| 4,884,771 A | 12/1989 | Scheit et al. |
| 5,067,672 A | 11/1991 | Bouzat |
| 5,139,218 A | 8/1992 | Bird et al. |
| 5,149,022 A | 9/1992 | Flament |
| 5,349,532 A | 9/1994 | Tilley et al. |
| 5,446,465 A | 8/1995 | Diefes et al. |
| 5,452,869 A | 9/1995 | Basuthakur et al. |
| 5,562,266 A | 10/1996 | Achkar et al. |
| 5,653,407 A | 8/1997 | Bertheux et al. |
| 5,667,171 A | 9/1997 | Fowell et al. |
| 5,745,869 A | 4/1998 | van Bezooijen |
| 5,758,846 A | 6/1998 | Fowell |
| 6,010,096 A | 1/2000 | Baghdasarian |
| 6,032,904 A | 3/2000 | Hosick et al. |
| 6,036,143 A | 3/2000 | Biber |
| 6,053,455 A | 4/2000 | Price et al. |
| 6,076,774 A | 6/2000 | Shah et al. |
| 6,205,400 B1 | 3/2001 | Lin |
| 6,260,805 B1 | 7/2001 | Yocum et al. |
| 6,266,616 B1 | 7/2001 | Needelman |
| 6,289,268 B1 | 9/2001 | Didinsky et al. |
| 6,341,249 B1 | 1/2002 | Xing et al. |
| 6,427,122 B1 | 7/2002 | Lin |

(Continued)

OTHER PUBLICATIONS

"Inertial Guidance System" www.wikipedia.org pp. 1-6.

(Continued)

*Primary Examiner* — J. Woodrow Eldred
(74) *Attorney, Agent, or Firm* — Klintworth & Rozenblat IP LLC

(57) ABSTRACT

A method of controlling attitude of a spacecraft during a transfer orbit operation is provided. The method includes providing a slow spin rate, determining the attitude of the spacecraft using a unified sensor set, and controlling the attitude of the spacecraft using a unified control law. The use of a unified set of sensors and a unified control law reduces spacecraft complexity, cost, and weight.

5 Claims, 14 Drawing Sheets

U.S. PATENT DOCUMENTS

| | | |
|---|---|---|
| 6,470,270 B1 | 10/2002 | Needelman et al. |
| 6,512,979 B1 | 1/2003 | Needelman et al. |
| 6,516,272 B2 | 2/2003 | Lin |
| 6,561,462 B1 | 5/2003 | Wang et al. |
| 6,571,156 B1 | 5/2003 | Wang et al. |
| 6,581,880 B2 | 6/2003 | Randolph et al. |
| 6,588,708 B2 | 7/2003 | Wang et al. |
| 6,615,117 B2 | 9/2003 | Li et al. |
| 6,622,969 B2 | 9/2003 | Yamashita |
| 6,681,159 B2 | 1/2004 | Li et al. |
| 6,691,033 B1 | 2/2004 | Li et al. |
| 6,695,263 B1 | 2/2004 | Goodzeit |
| 6,697,736 B2 | 2/2004 | Lin |
| 6,725,012 B1 | 4/2004 | Janson et al. |
| 6,766,227 B2 | 7/2004 | Needelman et al. |
| 2002/0020785 A1 | 2/2002 | Eyerly |
| 2002/0116125 A1 | 8/2002 | Lin |
| 2002/0116126 A1 | 8/2002 | Lin |
| 2003/0009284 A1 | 1/2003 | Needelman et al. |
| 2003/0057354 A1 | 3/2003 | Wu et al. |
| 2003/0093194 A1 | 5/2003 | Li et al. |
| 2003/0149528 A1 | 8/2003 | Lin |
| 2003/0171855 A1 | 9/2003 | Li et al. |
| 2004/0117074 A1 | 6/2004 | Wang et al. |
| 2005/0071055 A1 | 3/2005 | Needelman et al. |
| 2005/0113986 A1 | 5/2005 | Prakash et al. |
| 2005/0133671 A1 | 6/2005 | Wang et al. |
| 2005/0234644 A1 | 10/2005 | Lin |

OTHER PUBLICATIONS

"Kalman Filter" www.wikipedia.org pp. 1-15.
Boeing 702 Fleet, www.boeing.com, pp. 1-5.

UNIFIED ATTITUDE CONTROL FOR SPACECRAFT TRANSFER ORBIT OPERATIONS

CROSS REFERENCE TO RELATED APPLICATIONS

This application is a divisional of U.S. patent application Ser. No. 11/199,932 entitled "UNIFIED ATTITUDE CONTROL FOR SPACECRAFT TRANSFER ORBIT OPERATIONS", filed on Aug. 9, 2005, which is a continuation-in-part of U.S. patent application Ser. No. 10/910,430, entitled, "STAR-TRACKER-BASED ATTITUDE DETERMINATION FOR SPINNING SPACECRAFT", filed on Aug. 3, 2004, which is in turn a continuation-in-part of U.S. patent application Ser. No. 10/727,764, entitled, "UNIFIED SENSOR-BASED ATTITUDE DETERMINATION AND CONTROL FOR SPACECRAFT OPERATIONS", filed on Dec. 3, 2003, all of which are owned by the assignee of the present application, and the entirety of which are hereby expressly incorporated by reference herein.

BACKGROUND OF THE INVENTION

1. Field of the Invention

This invention is generally directed to satellite attitude determination and control systems and methods, and, more particularly, to satellite attitude determination and control systems and methods that are applicable to both transfer orbit and on-station operations.

2. Description of the Related Art

Transporting a spacecraft from the ground to a destination orbit is an integral and crucial part of any spacecraft mission. For example, to insert a spacecraft into a geosynchronous orbit, a launch vehicle typically injects the spacecraft into a low-altitude parking orbit. The spacecraft then performs transfer orbit operations to transfer the spacecraft from the parking orbit to a destination orbit. The transfer orbit is usually performed by firing a liquid apogee motor (LAM) with the spacecraft spinning around a LAM axis to stabilize the spacecraft and to even the thermal and power conditions, or by firing a combination of LAM and XIP thrusters. Once the spacecraft has completed its transfer orbit, it then may enter in-orbit testing and on-station operation.

From cradle to grave, the spacecraft may go through the following phases of operations: separation, transfer orbit operation (including coasting, spin speed change, reorientation and LAM burn), deployment (including antennas, reflectors, solar wings, radiators), acquisition (including power acquisition and attitude acquisition), in-orbit test (including antenna mapping), on-station operation (including normal pointing, momentum dumping, station keeping and station change), and a deorbiting operation.

Typically, spacecraft, such as communication satellites, use multiple separate sets of sensors and control algorithms for different phases of operations. For example, different sets of sensors and/or control algorithms may be used for attitude determination and control for bi-propellant spinning transfer orbit operations versus those that are used for on-station operations. The use of different sensors, attitude determination, and attitude control methods for spinning transfer orbits and on-station operations, respectively, increases the spacecraft weight, sensor and processor complexity, as well as the development cost for spacecraft attitude determination and control systems.

Spinning transfer orbit operations for spacecraft typically may be performed by ground-assisted attitude determination using a spinning earth sensor and a spinning sun sensor set. The measured leading edge and trailing edge of the earth detected by the earth sensor and the measured TOA (time of arrival) of the sun detected by the sun sensor collected and relayed periodically to a ground station. Typically, at least one orbit pass is dedicated to this data collection. A ground orbital operator may then run a ground attitude determination algorithm using these inputs and ephemeris-computed sun and earth positions to determine the spin axis attitude of the spacecraft. This spin axis attitude (the spin phase being still undetermined) is then uploaded to the spacecraft. Next, on-board software may use this spin axis attitude together with the spin phase measured by the spinning sun sensor to complete the 3-axis attitude determination for subsequent spacecraft reorientation or liquid apogee motor (LAM) burn.

On-station spacecraft operations typically use different sensors, such as a staring earth sensor assembly (STESA) and a wide field of view (WFOV) sun sensor assembly (SSA), and/or a star tracker for attitude determination. Thus, the sensors used for transfer orbit operations may lie dormant for the entire time that the spacecraft is on station. The number of sensor types used and the number of sensors used, increase the hardware and development cost, increase weight and launch cost, and complicate the mission operation. In addition, some spacecraft have configurations and equipment that may make it difficult in some situations to provide a clear field of view for some sensors, such as, for example, a WFOV SSA, which spans a diamond of about 120×120 deg.

In addition, a wheel-gyro wobble and nutation controller (WGWANC) is typically used for spinning transfer orbit coasting control. An example of a WGWANC controller can be found in U.S. Pat. No. 6,062,512, issued to Wang, et al. on May 16, 2000, a patent owned by the assignee of the present application, the entirety of which is hereby incorporated by reference herein. A WGWANC controller can compensate for wobble, capture nutation, and alter spacecraft dynamics by counter-spin or super-spin. However, a WGWANC controller is very different from the 3-axis stabilized controller typically used for on-station operation. A WGWANC controller is also susceptible to interact with the fuel slosh dynamics introduced by spacecraft spinning. Fuel slosh is inherently very difficult to model and adds large uncertainty to the WGWANC controller stability margin. Thus, multiple control types are typically needed for spinning transfer orbit operations versus on-station operations. The use of multiple control types increases the design/analysis/simulation/software/test and other development costs.

The present invention is directed to overcoming one or more of the problems or disadvantages associated with the prior art.

SUMMARY OF THE INVENTION

In accordance with one aspect of the invention, an attitude control method uses a slow spin rate and a unified sensor set and a unified control law for transfer orbit operations. The spacecraft solar wings may be either in stowed or deployed configuration. The unified control law may include a 3-axis stabilized attitude control law.

In accordance with another aspect of the invention, a method of controlling attitude of a spacecraft during a transfer orbit coasting operation includes providing a slow spin rate, determining the attitude of the spacecraft using a unified sensor set as the source of attitude sensor data, and controlling the attitude of the spacecraft using a unified control law.

In accordance with yet another aspect of the invention, a method of controlling attitude of a spacecraft during a transfer orbit motor burn operation includes providing a slow spin rate, determining the attitude of the spacecraft using a unified sensor set as the source of attitude sensor data, and controlling the attitude of the spacecraft using a unified control law.

According to one embodiment of the invention, a feedforward of an estimated overturn torque may be used to control attitude during a transfer orbit motor burn operation. The estimated overturning torque may be computed using pre-launch surveyed data of e.g. and motor axis, thruster firing data during the motor burn, momentum data during the motor burn, spacecraft rate data during the motor burn, an estimation of a motor burn moment arm, and/or may include feedforward of a zero overturning torque at motor turnoff.

BRIEF DESCRIPTION OF THE DRAWINGS

Objects, features, and advantages of the present invention will be become apparent upon reading the following description in conjunction with the drawing figures, in which.

DETAILED DESCRIPTION

Figure 1:
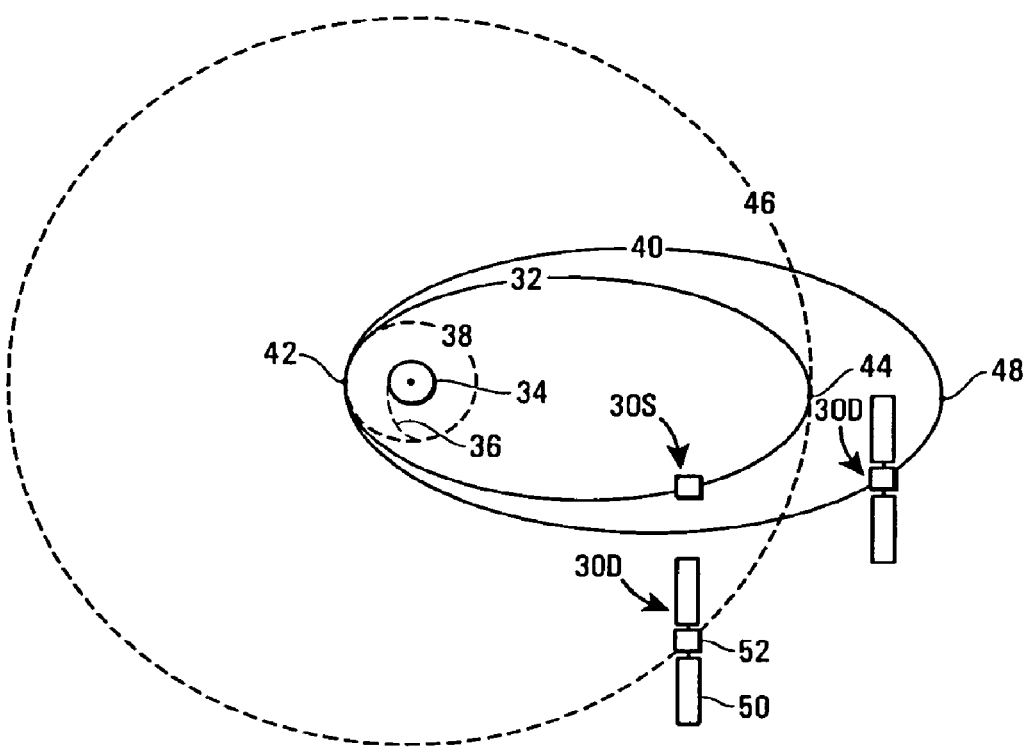
FIG. 1 is a diagram that illustrates various exemplary spacecraft orbits about the Earth.
Figure 2C:
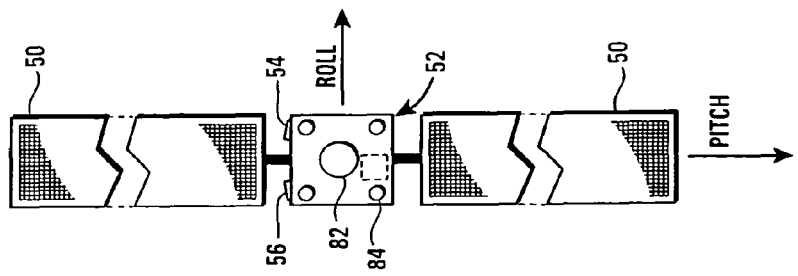
FIGS. 2A-2C are side views of a spacecraft that may incorporate the invention.
Figure 2B:
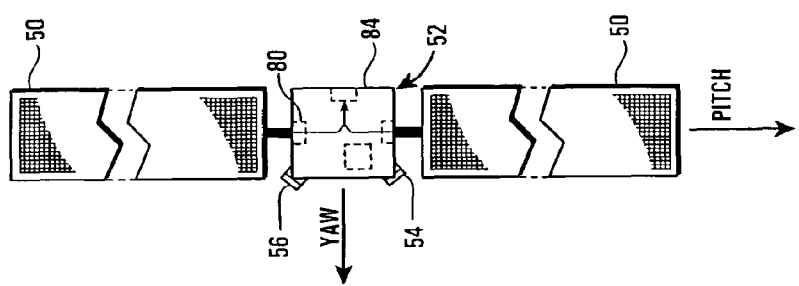
Figure 2A:
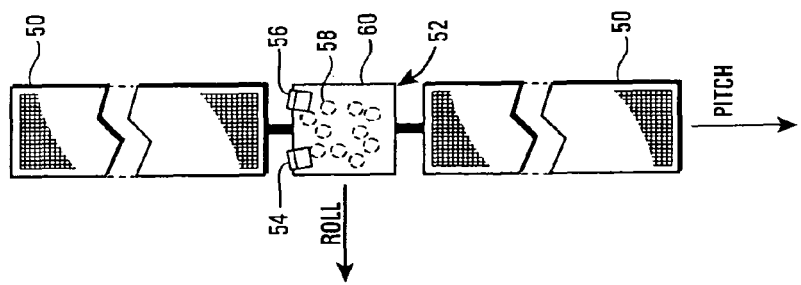

With reference initially to FIG. 1, a spacecraft 30S with its solar wings in a stowed position is depicted in a first transfer orbit 32 about the earth 34. Also depicted in FIG. 1 are a launch path 36, a parking orbit 38, and a second transfer orbit 40. The first transfer orbit 32, the parking orbit 38, and the second transfer orbit 40 may all have a common perigee point indicated at 42. The first transfer orbit 32 shares an apogee point indicated at 44, that is the same altitude as a geosynchronous orbit at 46. The second transfer orbit 40 has an apogee at 48 that is greater in altitude than the geosynchronous orbit 46. As indicated by the reference numeral 30D, the spacecraft in the second transfer orbit and in the geosynchronous orbit 46 may have solar wings 50 deployed and extending beyond a main portion 52 of the spacecraft 30D. As shown in FIGS. 2A-2C, the spacecraft 30D may include a primary star tracker 54 and a redundant star tracker 56, an optional gyro device, such as an inertial reference unit (IRU), and may carry any suitable payloads such as, for example, a set of communication antennas 58 that may be mounted on or near a positive yaw face 60 of the spacecraft 30D.

Figure 3:
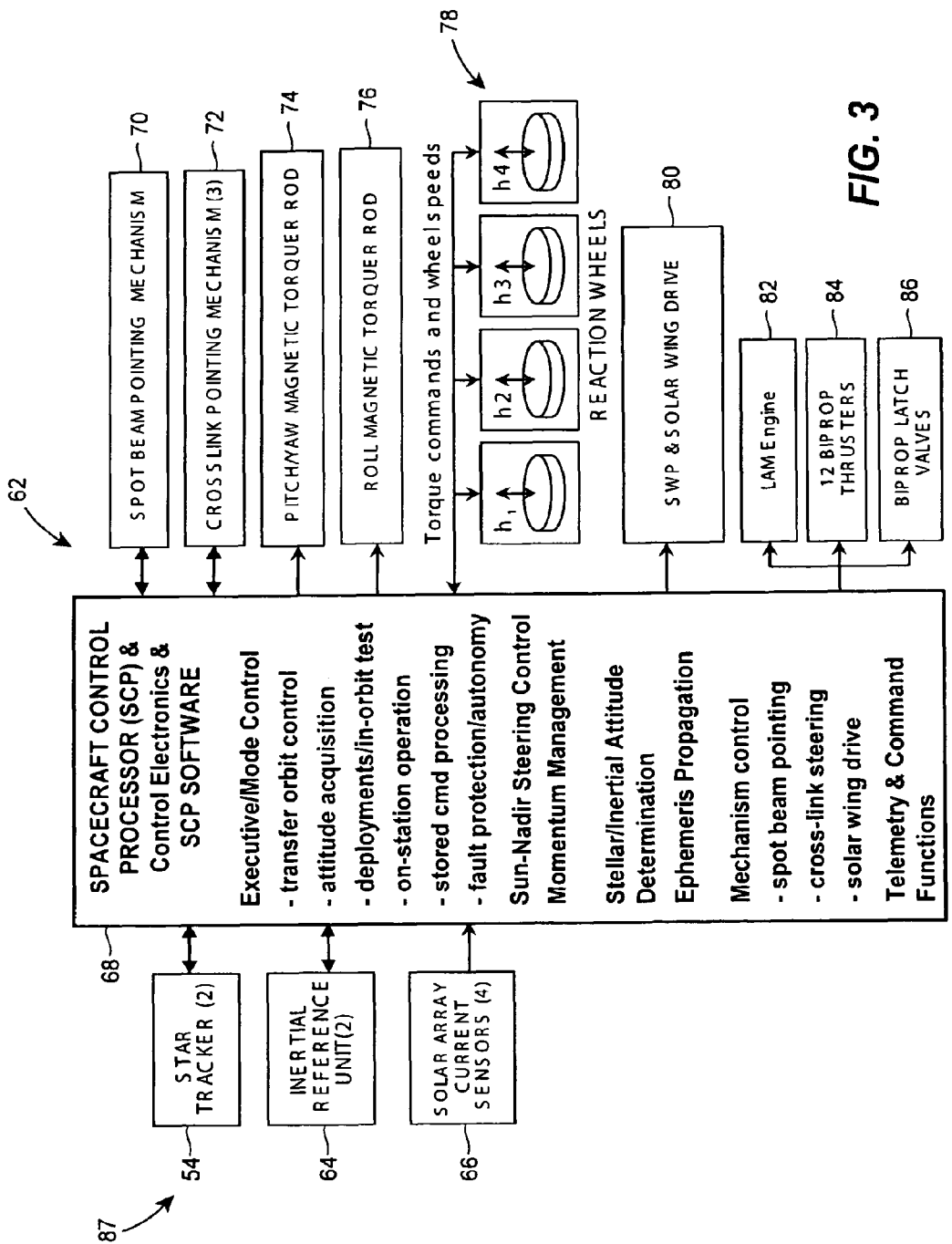
FIG. 3 is a diagram that illustrates an example of a modular attitude control system architecture.

Now referring to FIG. 3, a spacecraft attitude control system architecture, generally indicated at 62, includes one or more star trackers 54, and may also include inertia measurement units 64, as well as solar array current sensors 66 that provide inputs to a spacecraft control processor 68. The spacecraft control processor 68 may be used to command many spacecraft systems such as, for example, a spot beam pointing mechanism 70, a crosslink pointing mechanism 72, a pitch/yaw magnetic torquer rod 74, a roll magnetic torquer rod 76, and a set of three or more reaction wheels 78 (that may be arranged in a pyramid configuration) by providing commands for wheel torque and/or wheel speed. In addition, the spacecraft control processor may provide commands to a solar wing positioner (SWP) and solar wing drive 80, as well as thrusters and engines such as, for example, a liquid apogee motor engine 82, bi-propellant thrusters 84, and bi-propellant latch valves 86.

A unified attitude sensor set, generally indicated at 87, for multiple phases of spacecraft operations can be a plurality of star trackers 54. More than one star tracker 54 can be installed for failure redundancy and potential intrusion from bright objects, such as the sun, the moon and the earth. The star trackers are used to determine spacecraft attitude and derive spacecraft rate.

Alternatively, the unified attitude sensor set can be a plurality of star trackers 54 and inertia measurement units 64 (such as gyros) for multiple phases of spacecraft operations. The spacecraft attitude, rate and acceleration are determined by use of a Kalman filter using star tracker and gyro measurement data. Gyro parameters can also be calibrated by star tracker measurement in the Kalman filter. As a further alternative, the unified attitude sensor set can further be a plurality of star trackers, in addition to gyros and, or solar panel current sensors. Star tracker and gyro data may be used to determine spacecraft attitude, rate and acceleration, and calibrate gyro parameters via a Kalman filter. The solar panel current sensors may be used to validate the acquired stellar attitude after a loss-of-attitude anomaly, to maneuver the wing-stowed spacecraft 30S for power safety, and to position the solar wings 50 for power safety for wing-deployed spacecraft.

Figure 4:
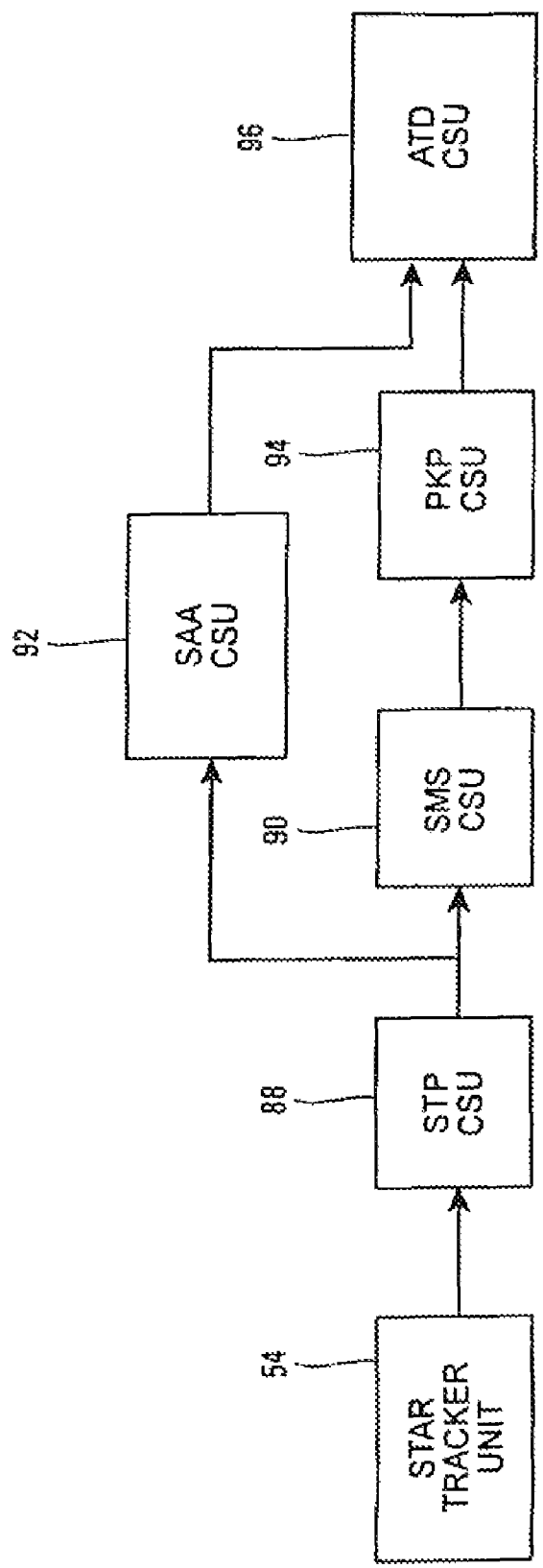
FIG. 4 is a flow diagram illustrating processing steps that may be used for attitude determination from star tracker data.

With reference to FIG. 4, a control software system may include computer software units (CSUs) such as star tracker processing (STP) CSU 88, that provides input to both a star measurement and steering (SMS) CSU 90 and a stellar attitude acquisition (SAA) CSU 92. The SMS CSU 90 provides input to a pre-Kalman processor (PKP) CSU 94, and the SAA CSU 92 and the PKP CSU 94 both provide input to an attitude determination (ATD) CSU 96.

Figure 5:
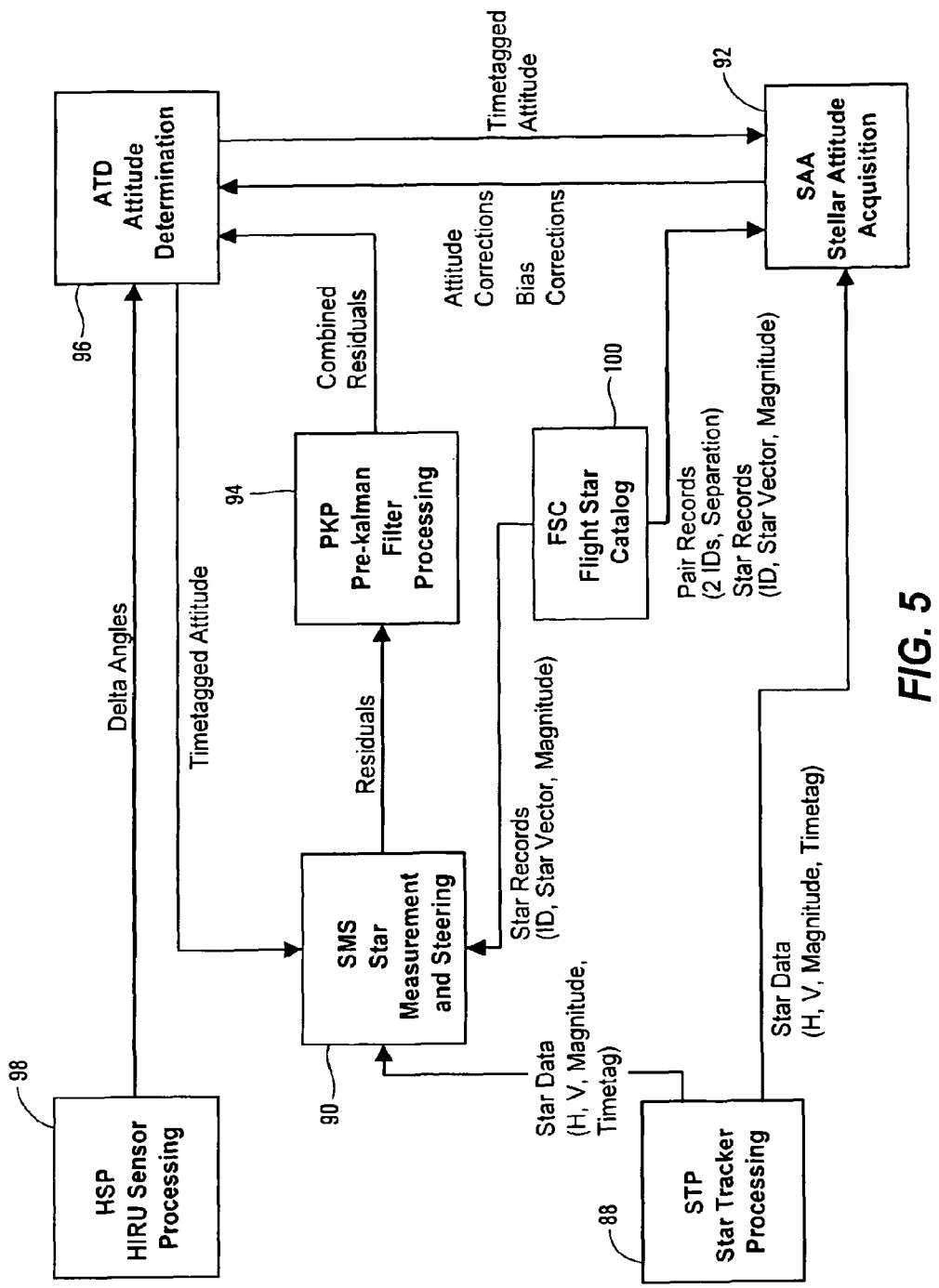
FIG. 5 is a block diagram illustrating an example of computer software units that may be used for transfer orbit and on-station attitude determination.

Now referring to FIG. 5, showing exemplary software units that may be used for transfer orbit and on-station attitude determination, a hemispherical inertial reference unit (HIRU) sensor processing CSU 98 operates in parallel with the star tracker processing CSU 88 using data from the star tracker unit 54, in providing attitude data to the ATD CSU 96. In addition, a flight star catalog (FSC) CSU 100 provides data to the SMS CSU 90 and the SAA CSU 92. In a scenario in which the attitude is lost and needs to be initialized during both transfer orbit and on-station operations, the STP CSU 88 may provide input directly to the SAA CSU 92 for attitude acquisition and initialization, whereas during nominal transfer orbit and on-station operations, the data from the STP CSU 88 may be provided to the SMS CSU 90 which in turn provides residual data to the PKP CSU 94 for preprocessing and subsequent handoff to the ATD CSU 96. The unified sensor architecture and attitude determination/control method can also be used to perform other typical spacecraft operations, such as separation, deployment, station keeping, and deorbiting.

Figure 6:
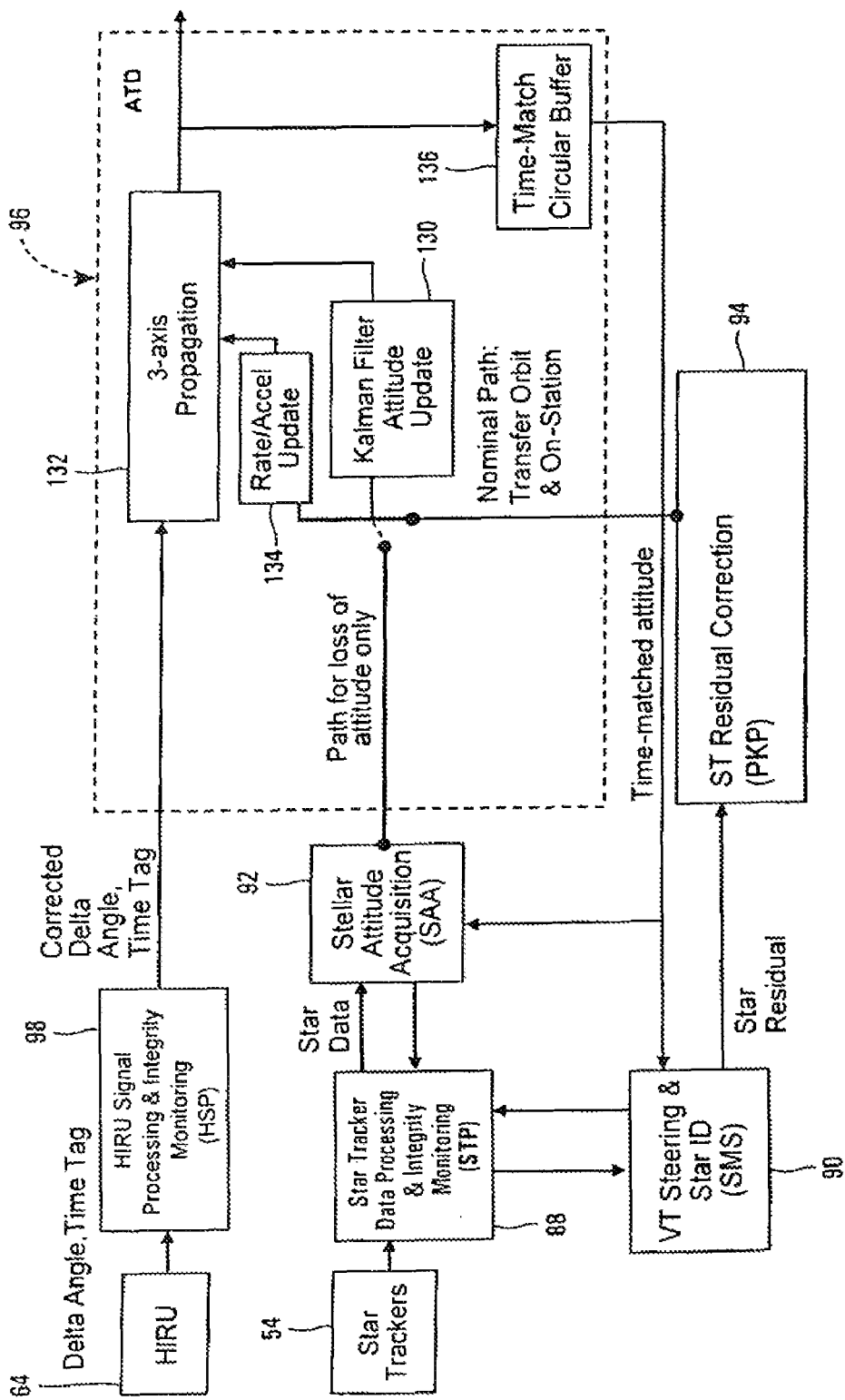
FIG. 6 is a block diagram illustrating further detail of an example of an attitude determination system that may be used for both transfer orbit and on-station operations.

With reference to FIG. 6, the ATD CSU 96 is shown in further detail, to include a Kalman filter attitude update CSU 130, a three axis propagation CSU 132, a rate/acceleration update CSU 134, and a time-match circular buffer CSU 136. The three axis propagation CSU 132 propagates the previous attitude to real time to a propagated attitude using delta angle measured by the inertia measurement units 64 during the time interval. It may also propagate spacecraft rate, acceleration and other dynamic states. As shown in FIG. 6, a separate path is used where there is a loss of attitude in which the stellar attitude acquisition CSU 92 provides inputs to the Kalman filter attitude update CSU 130. On the other hand, for nominal transfer orbit operations and nominal on-station operations, the PKP CSU 94 provides input to the Kalman filter attitude update CSU 130. In other words, the Kalman filter attitude update CSU 130 updates the propagated attitude (in the three axis propagation CSU 132) by attitude residual (derived from star tracker measurements) either from the PKP CSU 94 or the SAA CSU 92.

A WGWANC controller is not effective at slow spin rates because the controller makes use of the gyroscopic torque that is proportional to the spacecraft spin rate. However, a 3-axis stabilized controller can perform WGWANC control function by making the momentum in ECI as the attitude steering target as depicted in FIG. 7.

Figure 7:
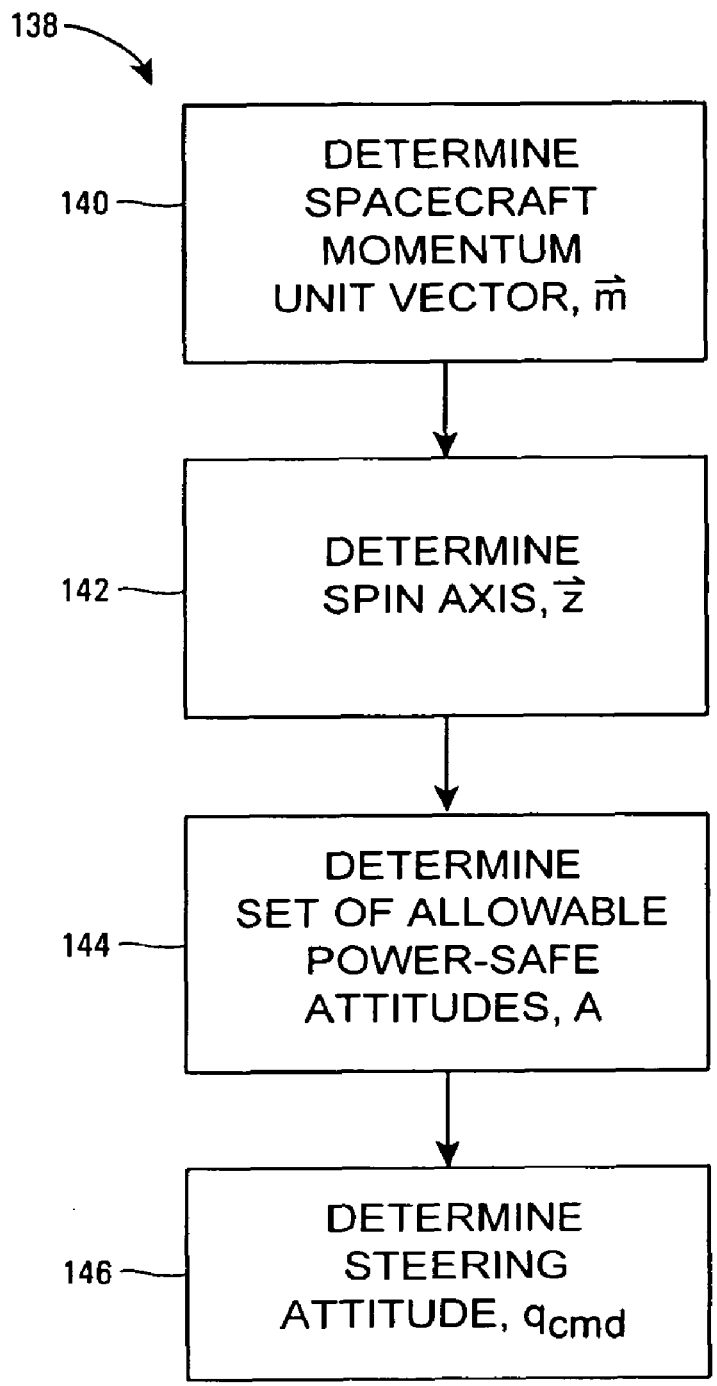
FIG. 7 is a flow diagram illustrating an example of three-axis stabilized controller for coasting operations in a transfer orbit.

Now referring to FIG. 7, a flow diagram for providing three-axis stabilized control during a coasting operation in a bi-propellant transfer orbit is generally indicated at 138. At block 140, the spacecraft angular momentum unit vector, $\overline{m}$, is determined in earth centered inertial (ECI) coordinates. $\overline{m}$ is inertially fixed up to the slow precession by environmental torque. At block 142, the designated spacecraft spin axis $\overline{z}$, is determined in the spacecraft body coordinates. The designated spacecraft spin axis can be any axis in the spacecraft body, but is usually the z-axis or x-axis in a typical spacecraft mission. Next, at block 144, a set of allowable power safe attitudes is determined relative to ECI, for example, attitudes having a sun polar angle of 90±20 deg. Next, at block 146, a steering attitude, $q_{cmd}$, is determined. $q_{cmd}$ is the attitude for which the spin axis is aligned as closely as possible with the momentum vector in ECI coordinates, but constrained to being in the set of allowable power safe attitudes, A. I.e., if we define $^{ECI}\overline{z}$ to be the designated spacecraft spin axis, as determined in the ECI frame, assuming a spacecraft attitude of $q_{cmd}$, then $q_{cmd}$ is the attitude which satisfies:

$$q_{cmd}: \max(\langle \overline{m}, {}^{ECI}\overline{z} \rangle) \text{ such that } q_{cmd} \subset A$$

where $\langle \cdot, \cdot \rangle$ is a mathematical symbol for the inner product or dot product of two vectors.

If power safety can be maintained, the steering law of $$q_{cmd}: \max(\langle \overline{m}, {}^{ECI}\overline{z} \rangle)$$

for the spacecraft 30S will have a steering attitude such that the designated spin axis is aligned with the momentum vector. Because the spin axis is wobbling and nutating around the momentum vector in ECI frame, the steering attitude is a time-varying attitude trajectory.

The generic dynamic equation for the spinning spacecraft with reaction wheels is $$T_{env} = I\dot{\omega} + \dot{H} + \omega \times (I\omega + H)$$

where $T_{env}$ is the external environmental torque that is typically small and only manifests over long period of time, I is the total inertia matrix of the spacecraft, $\omega$ is the spacecraft body spin speed, and H is the momentum in the reaction wheels. The last term on the right-hand-side is the gyroscopic torque that is small for spacecraft with slow spin rate. A WGWANC controller mainly uses $\omega \times H$ to control the spacecraft with rest of terms in the feedforward compensation. A 3-axis stabilized controller mainly use $\dot{H}$ to control the spacecraft with the rest of terms in the feedforward compensation. For spacecraft coasting at slow spin rate, the gyroscopic torque is comparatively small, the control law is essentially commanding a wheel torque in a direction which is perpendicular to both the designated axis and the momentum vector (i.e., $\overline{m} \times {}^{ECI}\overline{z}$ direction) to bring the two vectors to be co-aligned. This is the 3-axis stabilized controller replacing the existing WGWANC control law.

Thus, the three-axis stabilized controller can perform WGWANC-like control functions in a slow-spin transfer orbit operation. The benefit of this steering law for the steering attitude is that it reduces the reaction wheel activities and power consumption. A derivative of this steering law is by maximizing the difference between the power received from solar panel and the power consumed by the reaction wheels 78. A unified control law is a control law that is used in at least both the transfer orbit operations and the on-station operations. A 3-axis stabilized control law is an example of unified control law that is currently used in on-station operations, and is expanded to be used in transfer orbit operations by this invention.

During a bi-propellant transfer orbit, the spacecraft 30S may be deliberately spun at a low rate (e.g., from about 0.3 to about 1.5 deg/sec), to remain within the Star Tracker tracking rate limit (e.g., <3.0 deg/sec in sensor frame), and such that 3-axis stabilized controls can be used in lieu of the WGWANC controllers. The nominal spin rate may be set at only one-tenth of the STA tracking rate limit so that it will remain below the STA tracking rate limit, even after an unexpected thruster failure that spins up the spacecraft. The 3-axis stabilized controller has the option to use the momentum vector in Earth-centered inertial (ECI) coordinates as the z-axis target, similar to WGWANC controllers.

The above steering law is merely an example, with more steering laws introduced below. The steering law can be derived by maximizing the reaction wheel momentum storage duration, given a steering attitude within the power safe attitude set. This will lead to placing the spin axis to where the environmental torque effect is a minimum and the reaction wheel pyramid has the maximum margin for momentum storage. The momentum accumulated due to environmental torques may be dumped whenever necessary, for example, in the subsequent reorientation or burn maneuvers.

Momentum accumulation in a transfer orbit is less than 10 N–m–s in 12 hours in low perigee if the spin axis is parallel to the perigee velocity direction (based on data from Thuraya D1 spacecraft), and less than 4 N–m–s for any attitude after the perigee is raised to be over 500 Km (also based on data from Thuraya D1 spacecraft). Thrusters, such as bi-propellant thrusters 84, may be used to dump momentum during reorientation or during a LAM burn. A momentum dumping operation may be performed at each burn, but the wheel momentum envelope is capable of storing momentum for multiple days. Existing flight software supports filtered (slow) wheel momentum dumping.

The steering attitude can be optimized to be closer to the next LAM burn attitude (e.g., by minimizing the separation angle to the next LAM burn) to reduce next reorientation time and fuel consumption for the next LAM burn. This steering law may be used to place the coasting attitude as close as is practical to the next burn attitude as possible. The steering attitude may be set to maximize the difference between the power received by the solar panel and the power consumed by heaters, or to minimize power received by solar panel minus power consumed by heaters minus power consumed by the reaction wheels 78. The steering attitude can also be an optimization of the combination of the aforementioned objectives. The steering law above can also be a rate-only steering law if there is no intention to control the spin phase. In general, the optimal steering attitude may not be fixed over time, and may be a time-varying attitude trajectory. More specifically, on-board or ground-based software may be used to compute the desired steering attitude. The software may be used once for each event to compute the steering attitude, q; this is a "single point" steering attitude. Alternatively, the software may be used to continuously compute the steering attitude over time, q(t), at each computation interval. This is what is meant by a "time-varying" (indexed by time) steering attitude trajectory.

The LAM overturning torque during a LAM burn is fixed in the spacecraft body frame. The magnitude is proportional to the LAM force and the moment arm between LAM force and the spacecraft center-of-mass. One potential advantage of slow spinning is lower LAM turn on/off transients (although the gyroscopic stiffness is lower at low spin rate, the thruster firing phase lag is also reduced). The transient is mainly due to the time lag in the acceleration estimation. By reducing the time constant of the acceleration estimation loop, one can generally reduce the transients. Furthermore, by re-initializing the estimated acceleration to an a priori value, either based on pre-launch LAM alignment survey or based on previous burn acceleration estimate, the transients can be virtually subdued.

Figure 8:
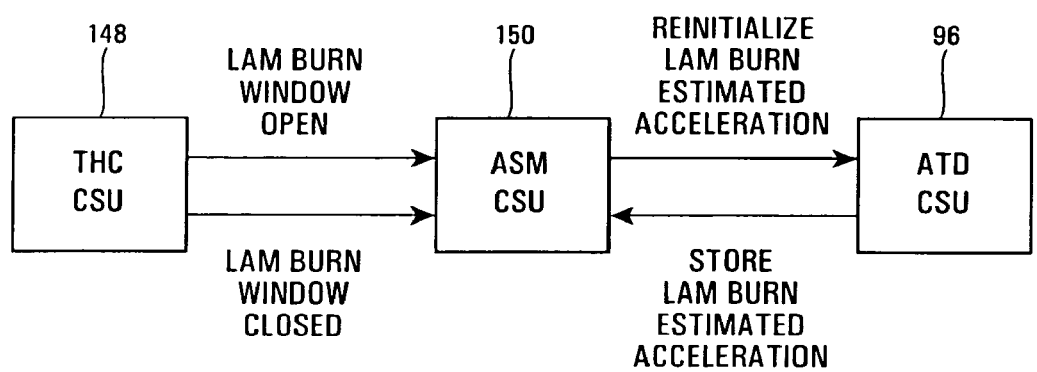
FIG. 8 is a block diagram further illustrating an example of a liquid apogee motor burn overturning torque feedforward control system and method.

With reference to FIG. 8, a Thruster Controller (THC) computer software unit (CSU) 148 determines LAM burn window opening and closing times, and provides them to a LAM burn sequencer or ascending mode sequencer (ASM) CSU 150. The LAM burn may also use 3-axis stabilized control at a slow-spin rate, and may use thrusters and/or the reaction wheels 78 to make attitude corrections during the LAM burn. LAM burn on-off transients may be reduced by estimating the overturning torque, and then feeding-forward the overturning torque in the form of an acceleration estimate to the ATD CSU 96. This estimated acceleration due to the overturning torque can be stored in the ASM CSU 150, and may be used to re-initialize the acceleration at the start of burn, and to reset the acceleration to zero at the end of the burn. In addition, the spacecraft 30S may be reoriented prior to each coasting operation and prior to each LAM burn, for example, to maximize solar power during coasting, as noted above, and/or to minimize fuel needed for attitude control during each LAM burn.

The timing for the LAM burn estimated acceleration re-initialization is as follows:

Based on a pre-launch survey of LAM orientation and estimated center-of-mass and spacecraft inertia, an a priori estimated acceleration of LAM overturning torque, a 3×1 vector in unit of rad/sec/sec, is computed and stored in the ASM CSU 150.

When the LAM burn software window is open and the LAM is to fire, the ASM CSU 150, may reinitialize the estimated acceleration in the ATD CSU 96 to the value stored in the ASM CSU 150 to immediately compensate for the LAM overturning torque to reduce the turn on transient.

When the LAM burn is about to end, the ASM CSU 150 may store the estimated acceleration from the ATD CSU 96 for use in the next LAM burn. Note that this end condition is very close to the initial condition for the next LAM burn.

When the LAM stops firing, the ASM CSU 150 may immediately reinitialize the estimated acceleration in the ATD CSU 96 to zero to reduce the LAM turn off transient.

A simultaneous power and stellar attitude acquisition sequencer may be provided for the bi-propellant spinning transfer orbit operation (when the solar wings 50 are stowed, using exposed solar panel currents). The sequencer may maintain a steady spin, and then configure and command the stellar attitude acquisition in parallel in the background processing. A steady spin may be achieved by stabilizing the spacecraft at a controlled rate determined by then estimated rate and momentum. At this point, spacecraft attitude may be initialized to an inaccurate, or even arbitrary, value. Inaccurate attitude does not affect spacecraft stabilization under this rate-only control law. Alternatively, a steady spin may be achieved by a 3-axis stabilized controller. Again, inaccurate attitude does not affect spacecraft stabilization either, as the control law may be referenced to an arbitrary inertial frame, offset to the ECI frame by the attitude error. The above spacecraft stabilization, controls and maneuvers can be achieved by the use of thrusters, reaction wheels, or a combination of thrusters and reaction wheels (e.g., use thrusters to dump the momentum to be within the wheel control authority, then use reaction wheels for attitude control).

The sequencer may also synchronize the attitude estimate of the spacecraft 30S with the panel current such that, for example, the identity attitude (spacecraft frame, at the current time, coaligns with the inertial frame) is synchronized with the panel peak current corresponding to the present sun polar angle, and an attitude corresponding to the identity attitude rotated through 90 degrees about the spacecraft spin axis is synchronized with the zero panel current. Therefore, by resetting the commanded and estimated attitude quaternions at the peak panel current, one can control the spacecraft to an identity attitude and bring the sun to the plane formed by the solar panel normal vector and the spin axis; so the exposed solar panels will be illuminated by the sun, providing maximum panel current for power safety.

To provide a power safe, 3-axis stellar attitude acquisition for the wing-deployed spacecraft 30D (solar wings 50 deployed, without the need of a sun sensor assembly (SSA)), a stellar attitude acquisition procedure may first stabilize the spacecraft 30D, for example, by simultaneously performing a slow rotisserie maneuver for power safety and using STA attitude acquisition to acquire the spacecraft attitude. When the wing is deployed, a simple rotisserie maneuver at an appropriate rate along any axis perpendicular to the wing-rotation-axis can maintain power/thermal safety indefinitely (momentum safety can also be assured provided a solar tacking algorithm is in place). For non-XIP spacecraft, with the potential of high momentum due to faulty thruster stuck-on (an event classified as highly improbable in failure mode analysis), the reaction wheels 78 may be saturated if there are only 3 reaction wheels left, then a WGWANC-like controller is needed. The WGWANC-like controller may align the spacecraft momentum vector with the spacecraft spin axis, and reaction wheel momentum bias can be commanded in the same direction (super-spin) to reduce the spin rate to suit stellar attitude acquisition, or in the opposite direction (counter-spin) to intentionally increase the spin rate.

Figure 9:
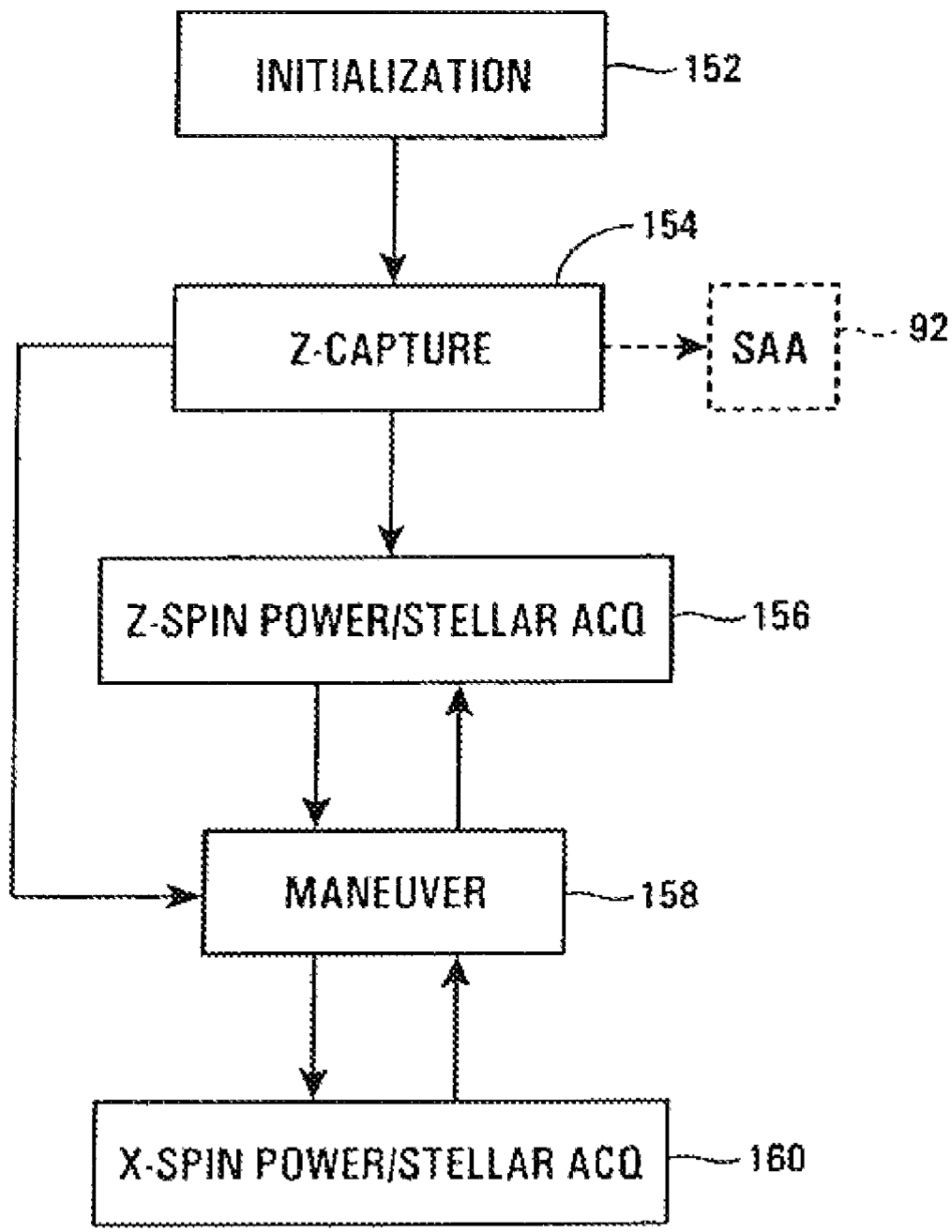
FIG. 9 is a block diagram illustrating a power/stellar acquisition system and method for recovering a spacecraft in a power-safe fashion from an anomaly during a transfer orbit.

Various examples of procedures for power/attitude acquisition in bi-propellant phase for the wing-stowed spacecraft 30S (solar wing stowed, no SSA) will now be described:

Wing current synced power acquisition: Owing to the slow spin, the spacecraft momentum after a failure is usually within the reaction wheel momentum envelope. If not, thrusters can be used in an open-loop or closed-loop control to dump the spacecraft momentum, such that the residual momentum is small enough for attitude control to be performed by reaction wheels. The controller will also select favorable spin direction and spin rate such that the reaction wheels will not be saturated. With reference to FIG. 9, after processor, sensors and actuators initialization at block 152, at block 154 the z-axis is captured using a rate-only controller, the Stellar Attitude Acquisition (SAA) 92 is initiated after the spacecraft is stabilized, and the spacecraft 30S may transition to a z-spin configuration, as indicated at block 156. The spacecraft 30S may then maintain a steady z-spin configuration as indicated at block 156, by rate-only control using the reaction wheels 78 or thrusters, use the wing current sensor to measure the peak current and to detect the spin phase when the peak current occurred. If the peak current is over the power-safe threshold, the spacecraft 30S is power safe and can remain in this state indefinitely. If the peak current is too low for power safety (e.g., sun to spin axis separation angle less than 70 deg), a maneuver may be performed (block 158) to bring the spacecraft 30S to an x-spin configuration, as indicated at block 160.

Figure 12:
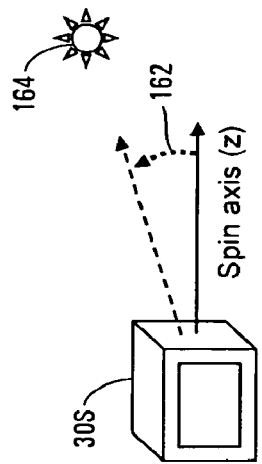
FIG. 12 is a diagram illustrating a configuration in which a spacecraft is not in a power safe state.
Figure 11:
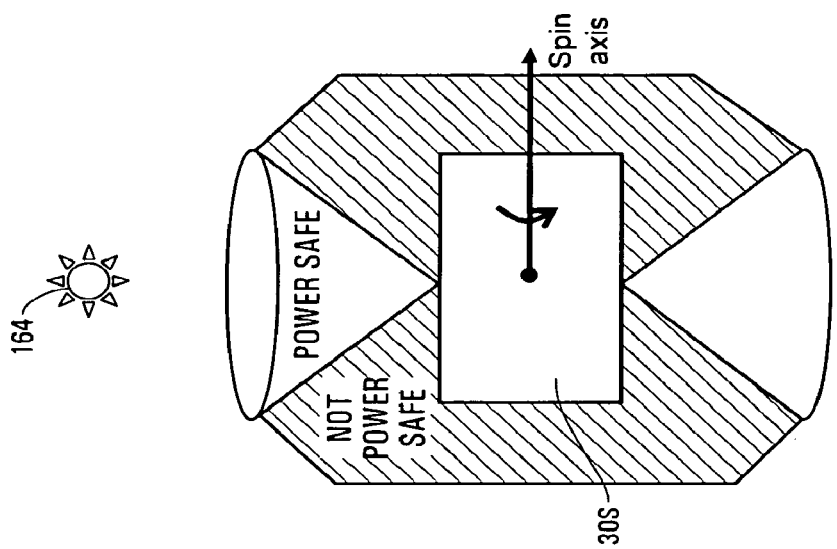
FIG. 11 is a diagram illustrating a spacecraft and designating regions in which the position of the sun relative to the spacecraft for either power safe or not power safe states.
Figure 10:
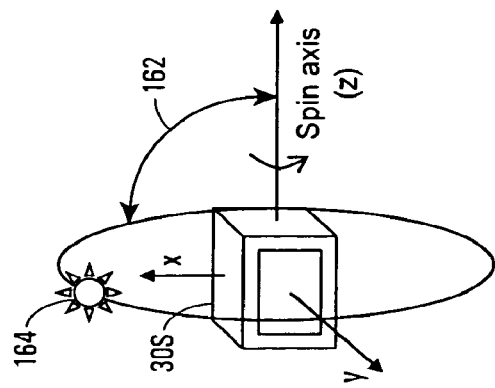
FIG. 10 is a diagram illustrating a spacecraft in a power safe state.
Figure 13:
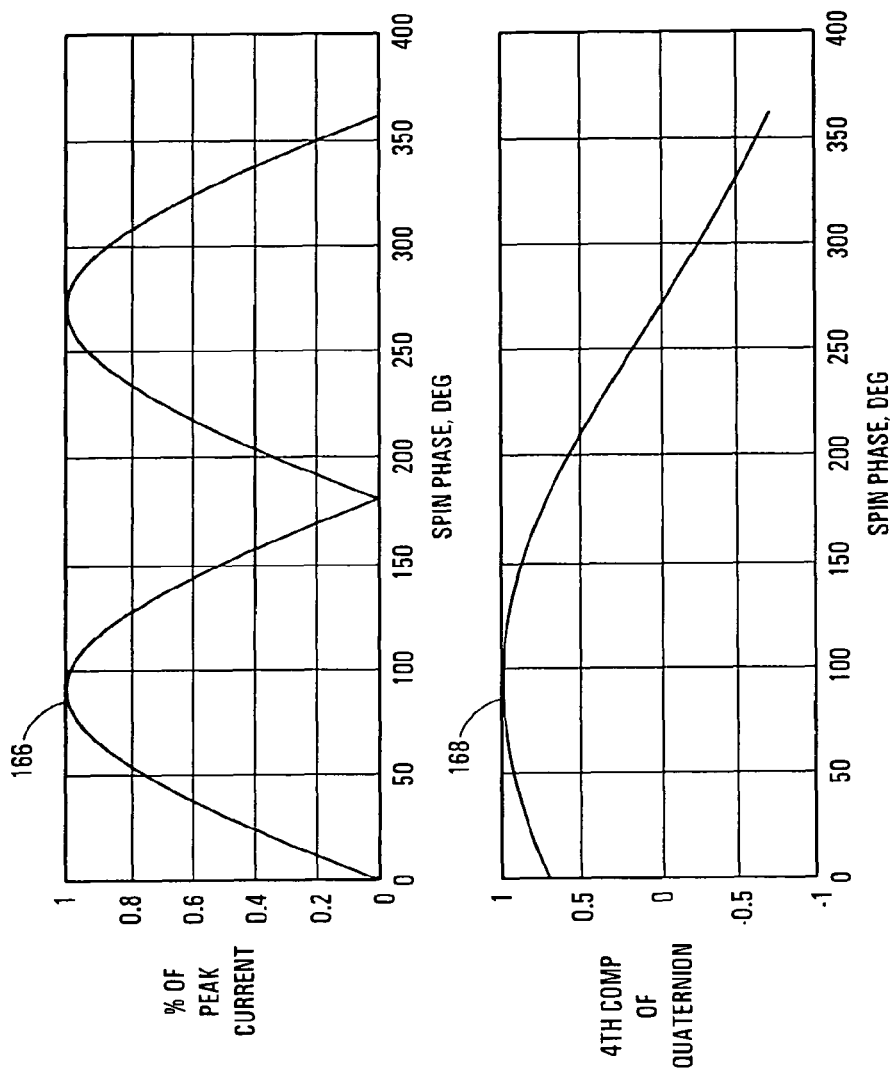
FIG. 13 is a graphic illustration of a synchronization of a spacecraft quaternion using solar panel current, in order to determine when a spacecraft is in a power-safe state.

As indicated in FIG. 10, the sun polar angle 162 when the spacecraft 30S reaches the power-safe z-spin configuration will be within 90±20 deg. The sun polar angle is the separation angle between the spin axis and the line-of-sight to the sun. FIG. 11 illustrates regions in which the position of the sun 164 relative to the spacecraft 30S for either power safe or not power safe states. FIG. 12 illustrates a configuration in which the spacecraft 30S is not in a power safe state. As shown in the plots of FIG. 13, if the spacecraft is not power safe, the controller may detect peak current 166, memorize or reset the attitude quaternion 168 at the peak current, and transition to x-spin. Peak current detection can be performed by various peak current finding algorithms. One algorithm is to perform a best sinusoidal fit to the measured sinusoidal panel current (panel current is sinusoidal in spin phase). Another algorithm is to find the largest value of the absolute value of the filtered panel current. By resetting the commanded and estimated attitude quaternions to identity at the peak current, the controller will stop the rotation at an attitude that the sun provides peak current (the magnitude of the peak current depends on sun polar angle. The maximum possible magnitude occurs when the sun polar angle is 90 degrees).

The sun is therefore in the plane spans by the current spin axis and the panel normal vector. Since the next spin axis is orthogonal to the plane, the next spin axis is therefore also orthogonal to the sun, or a sun polar angle of 90 degrees, that provides the maximum possible panel current for power safety.

Stellar attitude acquisition may be performed in parallel with power acquisition. Examples of stellar attitude acquisition and power acquisition systems and methods may be found in U.S. Pat. No. 6,470,270, issued to Needelman et al. on Oct. 22, 2002, and U.S. Pat. Nos. 6,571,156 and 6,588,708, issued to Wang et al. on May 27, 2003 and Jul. 8, 2003, respectively, all of which are owned by the assignee of the present application, and all of which are hereby expressly incorporated by reference herein.

A wing current based, quaternion triggered, sun-spin-axis precession (reorientation) using a thruster may also be used for the spacecraft 30S to reach a power safe attitude. An appropriate algorithm may be used to precess the spin axis either toward or away from the sun-line until power is maximized. The same 3-axis stellar attitude acquisition may be performed simultaneously to acquire the attitude.

In addition, one may run the attitude acquisition mode as above, using the reaction wheels 78 or a thruster to stop the spin or to spin at slow rate, and simultaneously command 3-axis stellar attitude acquisition to acquire the attitude. This may be accomplished by budgeting battery power margin (for example, a Boeing GEM spacecraft currently has about 6 hours and typical Boeing BS702 spacecraft have about 15 hours of battery life after a failure) to allow sufficient time for attitude acquisition (<0.5 hours), and then slewing to the desired power safe spin attitude. Two such attitudes are available, one is the ecliptic normal direction (normal direction of the earth orbit around the sun) with an achievable sun polar angle of 90 degrees, and the other is the equatorial normal (north/south direction of the Earth, also the north/south direction in the ECI frame). with sun polar angle in the range of 90±23.5 degrees for power safety. The following computed quaternion command, $q_{cmd}$, will maneuver the spacecraft designated spin-axis to be equatorial normal for power safety: the equatorial normal in ECI is a unit vector of $^{ECI}n=[0\ 0\ 1]^T$, let the spacecraft spin axis in ECI be $^{ECI}z$, then the slew direction and magnitude is $v={^{ECI}z} \times {^{ECI}n}$, where the x is the vector cross product, and the slew quaternion is $$q_{slew} = \frac{v}{|v|} \sin(0.5 \sin^{-1}(|v|)).$$

The commanded quaternion is computer by $q_{cmd} = q_{B\_ECI} \otimes q_{slew}$, where $q_{B\_ECI}$ is the spacecraft attitude estimated by stellar attitude acquisition algorithm, and the $\otimes$ is the quaternion product.

Still further, one may use a binary halving method to find the maximum-power spin-axis in x/z plane using thrusters. This is a systematic trial and error method to find the spin axis in x/z plane that is perpendicular to the sun line at that instant.

Acquired stellar attitude monitored with wing current threshold can be performed as follows:

Let $\bar{s}_{ECI}$ be the sun unit vector in the ECI frame, then $\bar{s}_B = C_{ECI}^B \bar{s}_{ECI}$ is the sun unit vector in the body frame, where $C_{ECI}^B$ is the attitude determined by the gyro and the star tracker.

Let $\bar{u}_n$ and $\bar{u}_s$ be the normal unit vectors for north and south solar panels, and let $I_{max}$ be the panel current when the sun is perfectly normal to the panel. Then, the predicted north panel current is $I_n = I_{max}(\bar{u}_n \cdot \bar{s}_B)$, and the predicted south panel current is $I_s = I_{max}(\bar{u}_s \cdot \bar{s}_B)$.

Let $I_{measured}$ be the measured panel current from the Integrated Power Controllers (IPC), then the panel current residual is $$I_{measured,n} - I_n$$

$$I_{measured,s} - I_s$$

A small panel current residual is an indication that the acquired stellar attitude is correct. On the other hand, if the residual is too large, the stellar attitude reacquisition may need to be restarted.

The bi-propellant transfer orbit can be performed with low spin or no spin at all (a substantially zero spin rate), using 3-axis stabilized controller. This will make the transfer orbit no different from on-station as far as attitude determination and control is concerned, and allow the spacecraft 30S to have a modular and unified attitude determination and attitude control for both transfer orbit and on-station operations.

Figure 14:
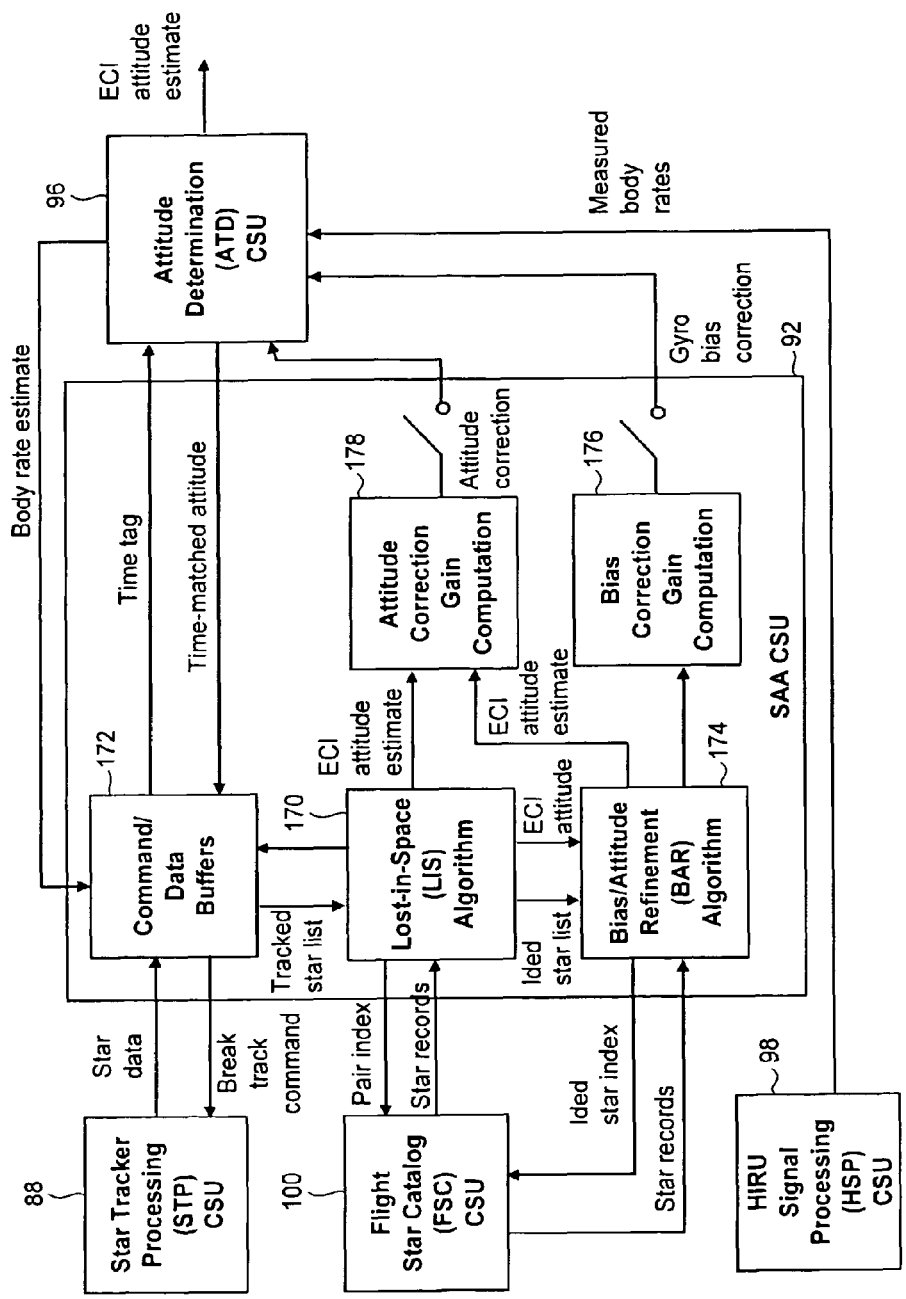
FIG. 14 is a block diagram, similar to that of FIG. 5, illustrating further detail of another example of an attitude determination system that may be used for both transfer orbit and on-station operations.

FIG. 14, shows exemplary software units that may be used for stellar attitude acquisition. The SAA CSU 92, performing initial attitude acquisition without any prior attitude knowledge, may be initiated in the coasting phase under a rate-only controller or a WGWANC controller wherein change of the attitude knowledge does not affect the controlled attitude. The lost-in-space algorithm module 170, may be, for example, but not limited to, that disclosed in U.S. Pat. No. 6,470,270 and U.S. Published Patent Application Number US 2004/0098177, both of which are hereby incorporated by reference herein. The lost-in-space algorithm module 170 may generate an initial attitude estimate, that may be inaccurate, and may use two consistent consecutive attitudes computed by measured star positions to verify that the attitude is acquired successfully.

The SAA CSU 92 may include command data buffers 172, adapted to store, send, and receive data to and from the STP CSU 88, ATD CSU 96, and the lost-in-space algorithm module 170, as indicated in FIG. 14. The SAA CSU may also include a bias/altitude refinement (BAR) algorithm module 174 that may be used in conjunction with a bias correction gain computation module 176 and/or an attitude correction gain computation module 178 to provide gyro bias correction and/or attitude correction data, respectively, to the ATD CSU 96.

Figure 15:
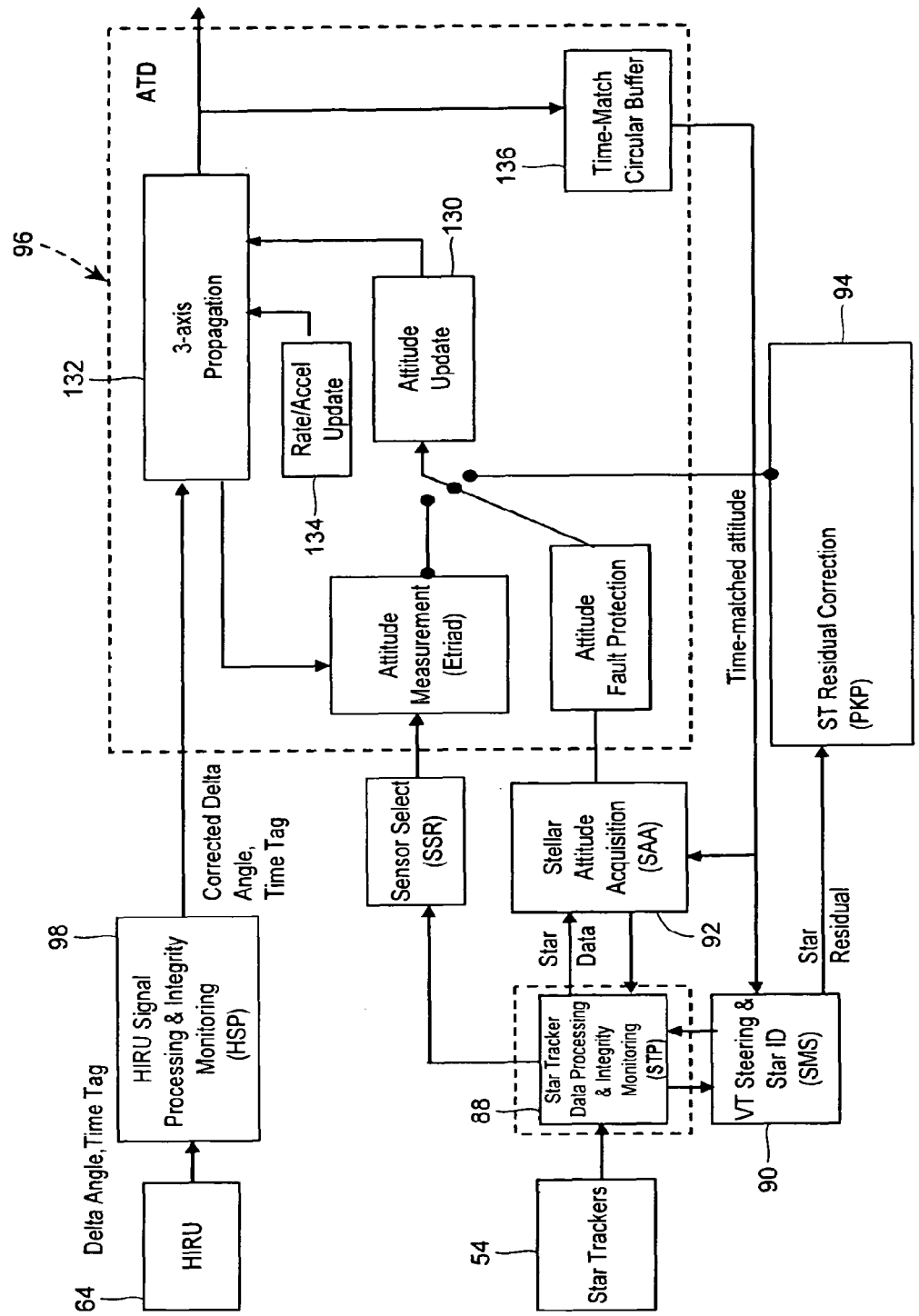
FIG. 15 is a block diagram, similar to that of FIG. 6, illustrating an example of a stellar attitude acquisition system.

With reference to FIG. 15, the ATD CSU 96 may include a Kalman filter attitude update module 130, a three axis propagation module 132, a rate/acceleration update module 134, and a time-match circular buffer module 136.

The acquired attitude may be checked with a computed wing current residual (measured wing current—predicted wing current using the acquired attitude) threshold. The attitude acquisition may be performed under a power safe condition where north/south solar panels constantly sweep through the sun at each revolution.

Once acquired, the attitude may be updated continuously so long as the attitude residual (stellar attitude—gyro propagated attitude) is below a computed threshold on a per update basis. The attitude may be continuously checked by the wing current residual to protect globally against potential attitude error that can not be detected on a per update basis. If the attitude is accurate, the flight software will be able to predict when to see the current on which panel at what magnitude. The 3-axis attitude may be maintained by the gyro and tracker, and ready for the reorientation or the LAM burn at any time. Gyro bias estimate convergence is a prerequisite for the reorientation and LAM burn. Loss of attitude, if occurring after an anomaly, may lead to autonomously re-initiating the stellar attitude acquisition method. Loss of attitude during reorientation or LAM burn may lead to autonomously disabling the stellar attitude update and relying only on the gyro propagated attitude.

A hemispherical inertial reference unit (HIRU) sensor processing CSU 98 may operate in parallel with processing of data from the star tracker unit 54, in providing attitude data to the ATD CSU 96. In addition, the flight star catalog (FSC) CSU 100 provides data to the lost-in-space algorithm module 170 and the BAR algorithm module 174.

Figure 16:
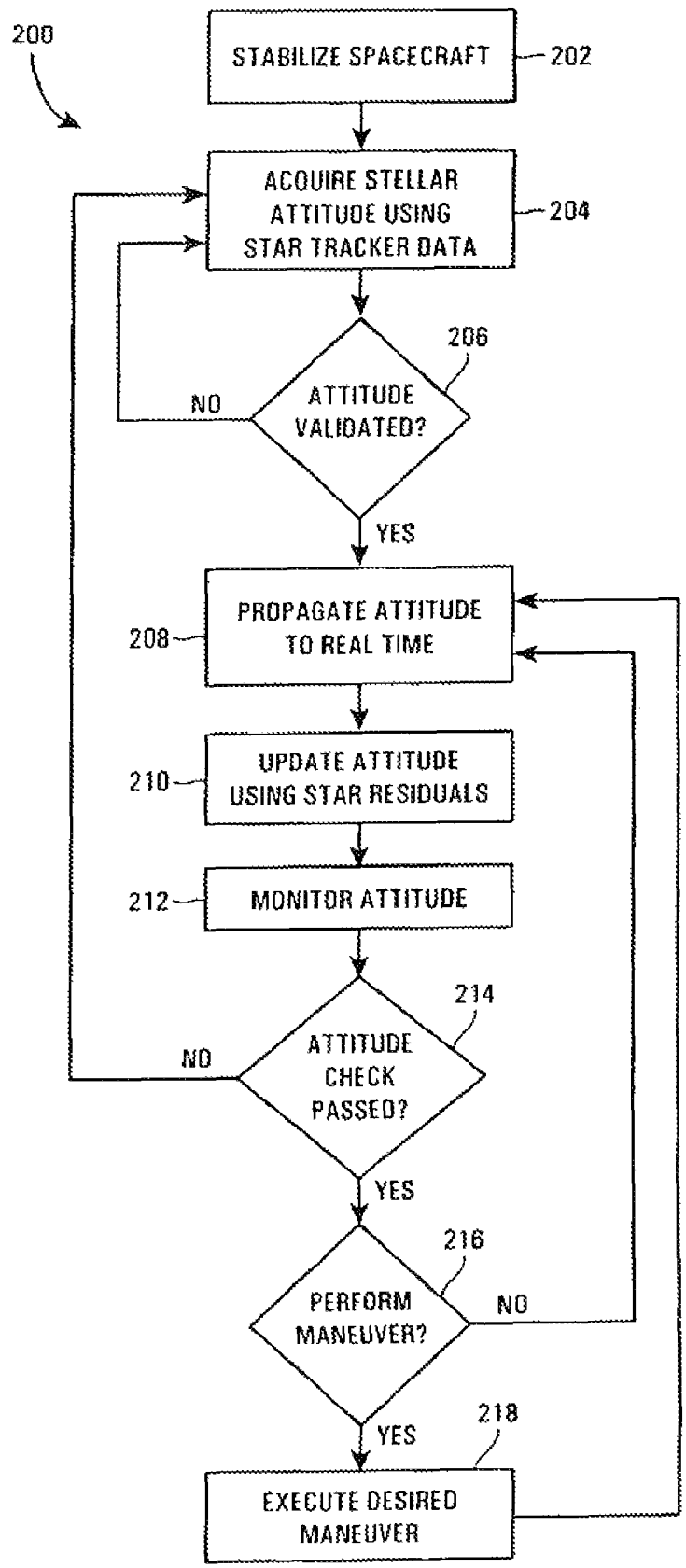
FIG. 16 is a flow diagram illustrating an example of stellar attitude determination in a spinning transfer orbit.

FIG. 16 depicts an exemplary procedure 200 for stellar attitude determination in a spinning transfer orbit:

Step 1 of the stellar attitude determination procedure 200 may include: stabilizing the spacecraft as indicated at block 202. This may be done using a rate-only controller, a 3-axis stabilized controller and/or a WGWANC controller such that the spacecraft is power safe and the rate is below star tracker rate limit. Attitude error does not affect stabilization as only the relative attitude or the rate is used by the controller.

Step 2 may include acquiring attitude using star tracker data, as indicated at block 204. This may include: acquiring the stellar attitude using star tracker measurements. This operation may use data from a single star tracker, multiple star trackers, one Inertial Measurement Unit (IMU), or multiple IMU's. The methods using such data may be chosen from suitable attitude acquisition algorithms, such as those which use star matching, multiple star matching, and multiple consistently determined attitudes.

Step 3 may include validating acquired stellar attitude, as indicated at block 206. This may include: validating the acquired attitude by comparing subsequently determined stellar attitude, and/or subsequent star residuals, checking against solar panel current, checking against sun sensor measurement, and/or checking against any available sensors. If the acquired attitude is not validated, the operation of acquiring stellar attitude using star tracker data may be repeated Step 4 may include propagating attitude to real time as indicated at block 208: periodically propagate the acquired attitude (or a previous attitude) to real time. The propagation may use IMU data, and/or star tracker estimated rate.

Step 5 may include updating attitude using star residuals as indicated at block 210: the propagated attitude may then be periodically updated by residuals from new star measurements or from newly determined stellar attitude. This update is typically only performed when the residual is within tolerable threshold. The residuals may also be used to update IMU parameters, such as gyro bias, scaling factor and misalignments.

Step 6 may include monitoring the attitude, as indicated at block 212. This may include: monitoring the attitude using difference to a subsequent determined stellar attitude, subsequent star residuals, checking against solar panel current, checking against a sun sensor measurement, and/or checking against any available sensors. It also may include checking the trending of updated IMU parameters to see if they are within a predetermined bound. As indicated at block 214, if any of the above checks failed for a predetermined duration, returning to step 2 to reacquired attitude.

Step 7 may include maneuvering the spacecraft, as indicated at block 216: with attitude passing monitoring criteria above, one may perform spacecraft spin speed change, reorientation to a desired attitude, and may perform LAM burn for orbit change. If attitude monitoring fails to meet the desirable criteria, one may suspend the stellar update and only perform the gyro propagation. At the end of maneuver, step 2 may be repeated to reacquire the attitude.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, although the embodiments are illustrated in spacecraft applications, the invention can be used in space planes and other vehicles.

We claim:

1. A method of controlling attitude of a spacecraft, in transfer orbit, spinning at a rate of substantially in a range of 0.3 degrees per second to 1.5 degrees per second in any direction of the spacecraft, comprising:
 designating a spin axis in spacecraft body coordinates;
 providing a spin rate for the spacecraft;
 determining the attitude of the spacecraft using star trackers as a sole source of attitude sensor data;
 steering the designated spacecraft spin axis toward a spacecraft total momentum vector by commanding a reaction wheel controlling torque in a direction substantially perpendicular to both the designated spacecraft spin axis and the spacecraft total momentum vector; and
 performing momentum dumping by maneuvering the spacecraft.

2. The method of claim 1, wherein said performing momentum dumping by maneuvering the spacecraft comprises a spacecraft reorientation maneuver.

3. The method of claim 1, wherein said performing momentum dumping by maneuvering the spacecraft comprises spacecraft motor burn.

4. A method of controlling attitude of a spacecraft, in transfer orbit, spinning at a rate of substantially in a range of 0.3 degrees per second to 1.5 degrees per second in any direction of the spacecraft, comprising:
 designating a spin axis in spacecraft body coordinates;
 placing reaction wheels relative to the designated spin axis;
 determining a total momentum vector of the spacecraft; and
 aligning the designated spacecraft spin axis to the total momentum vector by commanding reaction wheel controlling torque in a direction substantially perpendicular to both the designated spacecraft spin axis and the spacecraft total momentum vector.

5. The method of claim 4, wherein said commanding reaction wheel controlling torque comprises feedforward compensation of gyroscopic torque.

\* \* \* \* \*